(12) United States Patent
Cowan et al.

(10) Patent No.: US 12,359,110 B2
(45) Date of Patent: Jul. 15, 2025

(54) METHODS INVOLVING CEMENTS THAT EMPLOY CARBON DIOXIDE AS A REACTANT

(71) Applicant: Oxy Low Carbon Ventures, LLC, Houston, TX (US)

(72) Inventors: Kenneth M. Cowan, Sugar Land, TX (US); Robert L. Zeller, III, Seabrook, TX (US); Elias R. Callahan, III, El Campo, TX (US); James S. Willis, Blanco, TX (US)

(73) Assignee: Oxy Low Carbon Ventures, LLC, Houston, TX (US)

( * ) Notice: Subject to any disclaimer, the term of this patent is extended or adjusted under 35 U.S.C. 154(b) by 177 days.

(21) Appl. No.: 17/600,833

(22) PCT Filed: Apr. 1, 2020

(86) PCT No.: PCT/US2020/026235
§ 371 (c)(1),
(2) Date: Oct. 1, 2021

(87) PCT Pub. No.: WO2020/206011
PCT Pub. Date: Oct. 8, 2020

(65) Prior Publication Data
US 2022/0186103 A1    Jun. 16, 2022

Related U.S. Application Data

(60) Provisional application No. 62/828,169, filed on Apr. 2, 2019.

(51) Int. Cl.
*E21B 33/14* (2006.01)
*C04B 28/18* (2006.01)
(Continued)

(52) U.S. Cl.
CPC .............. *C09K 8/46* (2013.01); *C04B 28/188* (2013.01); *C04B 38/103* (2013.01);
(Continued)

(58) Field of Classification Search
CPC ............ C09K 8/46; E21B 33/14; E21B 43/34
(Continued)

(56) References Cited

U.S. PATENT DOCUMENTS 6,230,804 B1 * 5/2001 Mueller .............. E21B 41/0042
166/293
2002/0157575 A1 * 10/2002 DiLullo ................... C09K 8/46
106/711
(Continued)

FOREIGN PATENT DOCUMENTS

| CN | 105255464 A | 1/2016 |
|----|-------------|--------|
| WO | 2016/094506 A1 | 6/2016 |
| WO | 2018/175769 A1 | 9/2018 |

OTHER PUBLICATIONS

International Search Report and Written Opinion for corresponding PCT/US2020/026235 dated Jul. 3, 2020 (12 pp).

*Primary Examiner* — William D Hutton, Jr.
*Assistant Examiner* — Ashish K Varma
(74) *Attorney, Agent, or Firm* — Kenner Renner; Arthur M. Reginelli; Zachary J. Boehnlein

(57) ABSTRACT

A method of cementing an annular space between a pipe string and a well bore, the method comprising the steps of (a) providing a cement composition including a calcium-deficient calcium silicate; (b) mixing the cement composition with water to form a cement slurry; (c) mixing the cement slurry composition with carbon dioxide form a foamed cement; and (d) placing the foamed cement in the annular space between the pipe string and the wellbore.

19 Claims, 3 Drawing Sheets

(51) Int. Cl.
  *C04B 38/10* (2006.01)
  *C04B 40/02* (2006.01)
  *C09K 8/46* (2006.01)
  *E21B 43/34* (2006.01)
  *C04B 111/00* (2006.01)

(52) U.S. Cl.
  CPC .......... *C04B 40/0231* (2013.01); *E21B 33/14* (2013.01); *C04B 2111/00706* (2013.01)

(58) Field of Classification Search
  USPC ........................................................ 166/285
  See application file for complete search history.

(56) References Cited

U.S. PATENT DOCUMENTS

2014/0374097 A1* 12/2014 Morgan .................. C04B 28/02
                                                  166/293
2017/0362491 A1* 12/2017 Clarens .................. C09K 8/594

* cited by examiner

METHODS INVOLVING CEMENTS THAT EMPLOY CARBON DIOXIDE AS A REACTANT

This application is a National-Stage Application of PCT/US2020/026235 filed on Apr. 1, 2020, which claims the benefit of U.S. Provisional Application Ser. No. 62/828,168 filed on Apr. 2, 2019, which are incorporated herein by reference.

FIELD OF THE INVENTION

Embodiments of the present invention provide methods for the use of cements prepared using carbon dioxide as a reactant.

BACKGROUND OF THE INVENTION

In the production of oil and gas, it is common to cement piping string within a well bore. Advantages have also been achieved by foaming the cement, for example by mixing with nitrogen, to reduce the density of the cement and thereby facilitate placement of the cement in the annular space between the well bore and the piping string.

SUMMARY OF THE INVENTION

One or more embodiments of the present invention provide a method of cementing an annular space between a pipe string and a well bore, the method comprising the steps of (a) providing a cement composition including a calcium-deficient calcium silicate; (b) mixing the cement composition with water to form a cement slurry; (c) mixing the cement slurry composition with carbon dioxide to form a foamed cement; and (d) placing the foamed cement in the annular space between the pipe string and the wellbore.

Other embodiments of the present invention provide a process for cementing a pipe string within a well bore to form a carbon dioxide capture and sequestration region within a cement casing, where the pipe string has a generally tubular configuration with a surface opening and a downhole opening opposite the surface opening, and a generally annular space existing between the pipe string and the well bore; the method comprising (a) providing a first cement composition including a calcium-deficient calcium silicate; (b) mixing the first cement composition with water to form a first cement slurry; (c) providing a second cement composition including a calcium-rich calcium silicate; (d) mixing the second cement composition with water to form a second cement slurry; (e) placing the first cement slurry into a portion of the annular space to form a first generally annular column including first cement slurry; and (f) placing the second cement slurry into a portion of the annular space to form a second generally annular column including the second cement slurry, where said first generally annular column forms a carbon dioxide sequestration region.

Yet other embodiments of the present invention provide a process for cementing a pipe string within a well bore to form a carbon dioxide capture and sequestration region within a cement casing, where the pipe string has a generally tubular configuration with a surface opening and a downhole opening opposite the surface opening, and a generally annular space existing between the pipe string and the well bore; the method comprising (a) providing a cement composition including a calcium-deficient calcium silicate; (b) mixing the cement composition with water to form a cement slurry; (c) foaming a first portion of the cement slurry with a first gas stream that is substantially free of carbon dioxide to form a first cement foam; (d) placing the first cement foam into a portion of the annular space to form a first generally annular column including first cement foam; (e) foaming a second portion of the cement slurry with a second gas stream that substantially includes carbon dioxide to form a second cement foam; and (f) placing the second cement foam into a portion of the annular space to form a second generally annular column including the second cement foam.

Still other embodiments of the present invention provide a cemented production well comprising a well bore; a pipe string within said well bore; and a generally annular column of cement within at least a portion of the space between the pipe string and the well bore, where the column of cement includes a first annular region and a second annular region, said first annular region including a calcium-deficient calcium silicate and said second annular region including a calcium-rich calcium silicate.

Other embodiments of the present invention provide a method for forming a curable cement composition, the method comprising (a) providing a cement composition including a calcium-deficient calcium silicate; (b) mixing the cement composition with water to form a cement slurry; and (c) mixing the cement slurry composition with carbon dioxide form a foamed cement.

Still other embodiments of the present invention provide a process for forming a curable cement composition, the process comprising providing a cement composition including a calcium-deficient calcium silicate; and mixing the cement composition with carbon dioxide to form a curable cement composition.

Yet other embodiments of the present invention provide a process for forming a curable cement composition, the process comprising providing a cement composition including a calcium-deficient calcium silicate; placing the cement composition; and generating carbon dioxide in-site to cure the cement composition after placement of the cement composition.

Other embodiments of the present invention provide a process for capturing and sequestering carbon dioxide, the process comprising providing a calcium-deficient calcium silicate; and combining the calcium-deficient calcium silicate with carbon dioxide to form a foamed cement, where the amount of carbon dioxide combined with calcium-deficient calcium silicate is in excess of the carbon dioxide required to cure the calcium-deficient calcium silicate.

DETAILED DESCRIPTION OF ILLUSTRATIVE EMBODIMENTS

Figure 1:
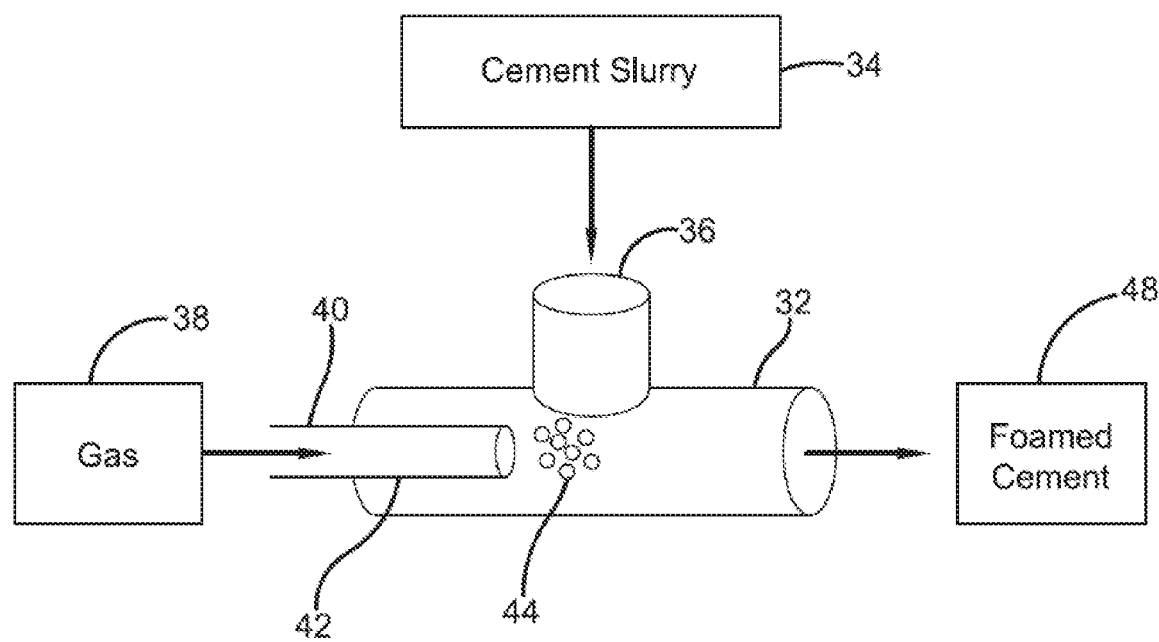
FIG. 1 is a schematic diagram of a foam generator employed within embodiments of the invention.

Embodiments of the invention are based, at least in part, on the discovery of a foamed cement that is prepared by mixing, under foaming conditions, carbon dioxide and a cement slurry that includes calcium-deficient calcium silicates. It is believed that by dispersing carbon dioxide within a cement slurry including calcium-deficient calcium silicates, a useful curable cement formulation can be prepared.

In particular embodiments, the foamed cements are useful in oil-field applications, particularly for use in cementing well casings. Other embodiments provide a process of over feeding the amount of carbon dioxide necessary for a reaction with the calcium-deficient calcium silicate so that the excess carbon dioxide is trapped within the cement foam and is sequestered permanently within the cured cement.

Calcium-Deficient Calcium Silicates

The term calcium-deficient calcium silicates refers to naturally-occurring minerals or synthetic materials that include less than two moles of calcium per mole of silica. Exemplary calcium-deficient calcium silicates include naturally-occurring $CaSiO_3$, synthetic $CaSiO_3$, which may be referred to as pseudo-wollastonite or synthetic wollastonite, and which may be formulated as $CaO \cdot SiO_2$, and $Ca_3Si_2O_7$, which may be referred to as rankinite, and which may be formulated as $3CaO \cdot 2SiO_2$. In other embodiments, Portlandite or calcium hydroxide may be employed in lieu of or in addition to the calcium-deficient calcium silicates.

In contrast to the calcium-deficient calcium silicates, reference may be made to calcium-rich silicates, which refers to naturally-occurring minerals or synthetic materials that include two or more moles of calcium per mole of silica. Exemplary calcium-rich calcium silicates include $Ca_2SiO_4$, which may be referred to as belite, and which may be formulated as $2CaO \cdot SiO_2$, and $Ca_3SiO_5$, which may be referred to as alite, and which may be formulated as $3CaO \cdot SiO_2$.

In one or more embodiments, either the calcium-deficient or calcium-rich calcium silicates may include one or more other metal ions and oxides (e.g., aluminum, magnesium, iron or manganese oxides), or blends thereof.

In one or more embodiments, pseudo-wollastonite may be prepared by employing techniques that are known in the art including those disclosed in U.S. Pat. Nos. 8,114,367, 8,313,802, 8,709,960, 9,216,926, 9,266,147, 9,868,667, International WO 2009/102360 (PCT/US2008/083606), WO 2011/053598 (PCT/US2010/054146), WO 2011/090967 (PCT/US2011/021623), and U.S. Publ. Nos. 2012/0312194, 2014/0127450, 2014/0127458, 2014/0342124, 2014/0363665, 2015/0056437, 2015/0266778, 2016/0236984, and U.S. Publ. No. 2016/0244968, each of which are expressly incorporated herein by reference in their entirety for all purposes.

One or more useful embodiments of the present invention employ synthetic wollastonite, and therefore, for purposes of this written description, reference may be made to synthetic wollastonite, and unless otherwise stated, reference to synthetic wollastonite for purposes of describing the various embodiments will be understood to apply to any of the disclosed calcium-deficient calcium silicates.

In one or more embodiments, the synthetic wollastonite is ground; i.e. it is used as a ground material. In one or more embodiments, the synthetic wollastonite has a median particle size of less than 200, in other embodiments less than 100, in other embodiments less than 50, in other embodiments less than 40, and in other embodiments less than 30 μm. In these or other embodiments, the synthetic wollastonite has a median particle size of from about 1 to about 200, in other embodiments from about 5 to about 200, in other embodiments from about 5 to about 50, and in other embodiments from about 7 to about 30 μm.

In one or more embodiments, the synthetic wollastonite (ground) is characterized by a loose bulk density of less than 1.0, in other embodiments less than 0.9, and in other embodiments less than 0.8 g/mL. In these or other embodiments, the synthetic wollastonite is characterized by a loose bulk density of from about 0.6 g/mL to about 0.8 g/mL (loose). In one or more embodiments, the synthetic wollastonite is characterized by a tapped bulk density of less than 1.4, or in other embodiments less than 1.3 g/mL. In these or other embodiments, the synthetic wollastonite is characterized by a tapped bulk density of from about 1.0 about 1.2 g/mL.

In one or more embodiments, the synthetic wollastonite (ground) is characterized by a surface area of greater than 1.3, in other embodiments greater than 1.4, and in other embodiments greater than 1.5 $m^2/g$. In these or other embodiments, the synthetic wollastonite is characterized by a surface area of from about 1.5 to about 2.0 $m^2/g$.

Cement Compositions—Synthetic Wollastonite

In one or more embodiments, the cement compositions including synthetic wollastonite include greater than 30 wt %, in other embodiments greater than 40 wt in other embodiments greater than 50 wt %, in other embodiments greater than 60 wt %, in other embodiments greater than 70 wt %, in other embodiments greater than 80 wt %, in other embodiments greater than 90 wt %, and in other embodiments greater than 95 wt % synthetic wollastonite.

In one or more embodiments, the cement compositions including synthetic wollastonite may also include naturally-occurring or synthetic magnesium silicates. In one or more embodiments, the cement compositions including synthetic wollastonite may include less than 50 wt %, in other embodiments less than 40 wt %, in other embodiments less than 30 wt %, in other embodiments less than 20 wt %, in other embodiments less than 10 wt %, in other embodiments less than 5 wt % and in other embodiments less than 1 wt % magnesium silicates.

In one or more embodiments, the cement compositions including synthetic wollastonite may also include calcium-rich calcium silicates. In one or more embodiments, the cement compositions including synthetic wollastonite may include less than 50 wt %, in other embodiments less than 40 wt %, in other embodiments less than 30 wt %, in other embodiments less than 20 wt %, in other embodiments less than 10 wt %, in other embodiments less than 5 wt %, and in other embodiments less than 1 wt calcium-rich silicates.

In one or more embodiments, the cement compositions including synthetic wollastonite may also include foaming agents. The foaming agents may include, but are not limited to, synthetic surfactants, protein-based detergents, glue resins, hydrolyzed proteins, resin soaps, saponins, and mixtures thereof. In particular embodiments, the foaming agents may include an ethoxylated alcohol ether sulfate surfactant or an alkyl or alkene amidopropyl dimethyl amine oxide.

Cement Slurry—Synthetic Wollastonite

In one or more embodiments, a cement slurry is formed by combining a cement composition (e.g. a cement composition including synthetic wollastonite as described herein) with a fluid. In one or more embodiments, the fluid is water. In one or more embodiments, the cement slurry includes less than 60 wt %, in other embodiments less than 50 wt %, in other embodiments less than 40 wt %, in other embodiments less than 30 wt %, in other embodiments less than 20 wt %, in other embodiments less than 10 wt %, in other embodiments less than 7 wt %, and in other embodiments less than 5 wt % water, with balance including solids (e.g. particulate calcium silicate). In these or other embodiments, the cement slurry includes greater than 1 wt %, in other embodiments greater than 3 wt %, in other embodiments greater than 8 wt %, in other embodiments greater than 10 wt %, in other embodiments greater than 15 wt %, in other embodiments greater than 20 wt %, and in other embodiments greater than 30 wt % water, with balance including solids (e.g. particulate calcium silicate). In one or more embodiments, the cement slurry includes from about 1 to about 60 wt %, in other embodiments from about 2 to about 40 wt %, and in other embodiments from about 5 to about 40 wt % water.

Foamed Cement

According to embodiments of this invention, a foamed cement is prepared by combining a cement slurry with a gas. In one or more embodiments, the gas is a carbon dioxide-rich gas stream. In these or other embodiments, the carbon dioxide-rich stream may also optionally include an inert gas. In one or more embodiments, the combination of the cement slurry and the gas used to foam the slurry results in a uniform, stable dispersion of gas (e.g. carbon dioxide) within the cement slurry. As the skilled person will appreciate, the differential pressure to create a stable foamed mixture may depend upon well conditions, including well pressure, depth, and temperature.

In one or more embodiments, the carbon dioxide-rich gas stream used to foam the cement includes sufficient levels of carbon dioxide to effect a cure of a calcium-deficient cement composition. In one or more embodiments, the carbon dioxide-rich stream includes greater than 1 vol %, in other embodiments greater than 5 vol %, in other embodiments greater than 10 vol %, in other embodiments greater than 25 vol %, and in other embodiments greater than 50 vol % carbon dioxide. In these or other embodiments, the carbon dioxide-rich gas stream used to foam the cement includes 100 vol %, in other embodiments less than 100 vol %, in other embodiments less than 90 vol %, in other embodiments less than 75 vol %, in other embodiments less than 50 vol %, and in other embodiments less than 25 vol % carbon dioxide. In one or more embodiments, the carbon dioxide-rich gas stream includes from about 1 to about 100, in other embodiments from about 5 to about 90, and in other embodiments from about 10 to about 80 vol % carbon dioxide. In one or more embodiments, the amount of carbon dioxide used to foam the cement includes amounts in excess of the amount of carbon dioxide required to effect a cure of a calcium-deficient cement composition. As a result, within these embodiments, the excess carbon dioxide is entrapped within the cells of the foamed cement where they can be sequestered for long term capture within the cured cement.

In one or more embodiments, the combination of the carbon dioxide, optional inert gas, and cement slurry results in a foamed cement having a density (at atmospheric conditions) of less than 20, in other embodiments less than 18, in other embodiments less than 15, in other embodiments less than 12, in other embodiments less than 10, in other embodiments less than 8, and in other embodiments less than 6 lbs/gal.

In one or more embodiments, the combination of the carbon dioxide, optional inert gas, and cement slurry results in a foamed cement (at atmospheric conditions) having a carbon dioxide volume fraction of greater than 8%, in other embodiments greater than 10%, in other embodiments greater than 12%, and in other embodiments greater than 15%. In these or other embodiments, the foamed cement has a carbon dioxide volume fraction of less than 70%, in other embodiments less than 50%, in other embodiments less than 40%, and in other embodiments less than 35%. In one or more embodiments, the foamed cement has a carbon dioxide volume fraction of from about 8 to about 70, in other embodiments from about 10 to about 40, and in other embodiments from about 15 to about 35%.

The foamed cement according to embodiments of the invention can be prepared by using conventional techniques for foaming cement. In an exemplary embodiment, a pressurized gas (i.e. carbon dioxide or mixture of carbon dioxide and an inert gas) is combined with a cement slurry within an inline mixing apparatus such as foam generator. As an example, reference is made to FIG. 1, which shows foam generator 32, which receives cement slurry stream 34 through inlet 36. Foam generator 32 also receives pressurized gas stream 38 through inlet 40, which may optionally be equipped with a choke or other restriction element 42. In one or more embodiments, pressurized gas stream 38 is atomized within foam generator 32 to form atomized gas stream 44. Cement slurry 34 and atomized gas stream 44 are contacted within foam generator 32, which results in high pressure injection of the gas stream into the slurry and provides a mixture wherein discrete gas bubbles are dispersed within a continuous matrix of the cement slurry (i.e. a foamed cement 48).

Placement of Cement within Well Annular Space

In one or more embodiments, the cements described herein are placed within the generally annular space that exists between a well bore and an outermost piping string that is disposed within the well bore. Embodiments of the invention can be described with reference to FIG. 2, which shows well 50 including well bore 52 and piping string 54 positioned within well bore 52. In one or more embodiments, piping string 54 is the outermost piping, which may also be referred to as tubing 54 or casing 54, within well bore 52 and is therefore the piping most proximate to an inner surface 53 of well bore 52. Well 50 may include multiple piping strings, with the additional piping strings being located concentrically within casing 54. A generally annular space 56 exists between inner surface 53 and casing 54. In one or more embodiments, annular space 56, which may also be referred to as annular volume 56, may generally extend from surface 60 (i.e. at the top of well bore 52) to bottom 62 of well bore 52. In other embodiments, annular space 56 may only extend in a portion of well bore 52.

Figure 2:
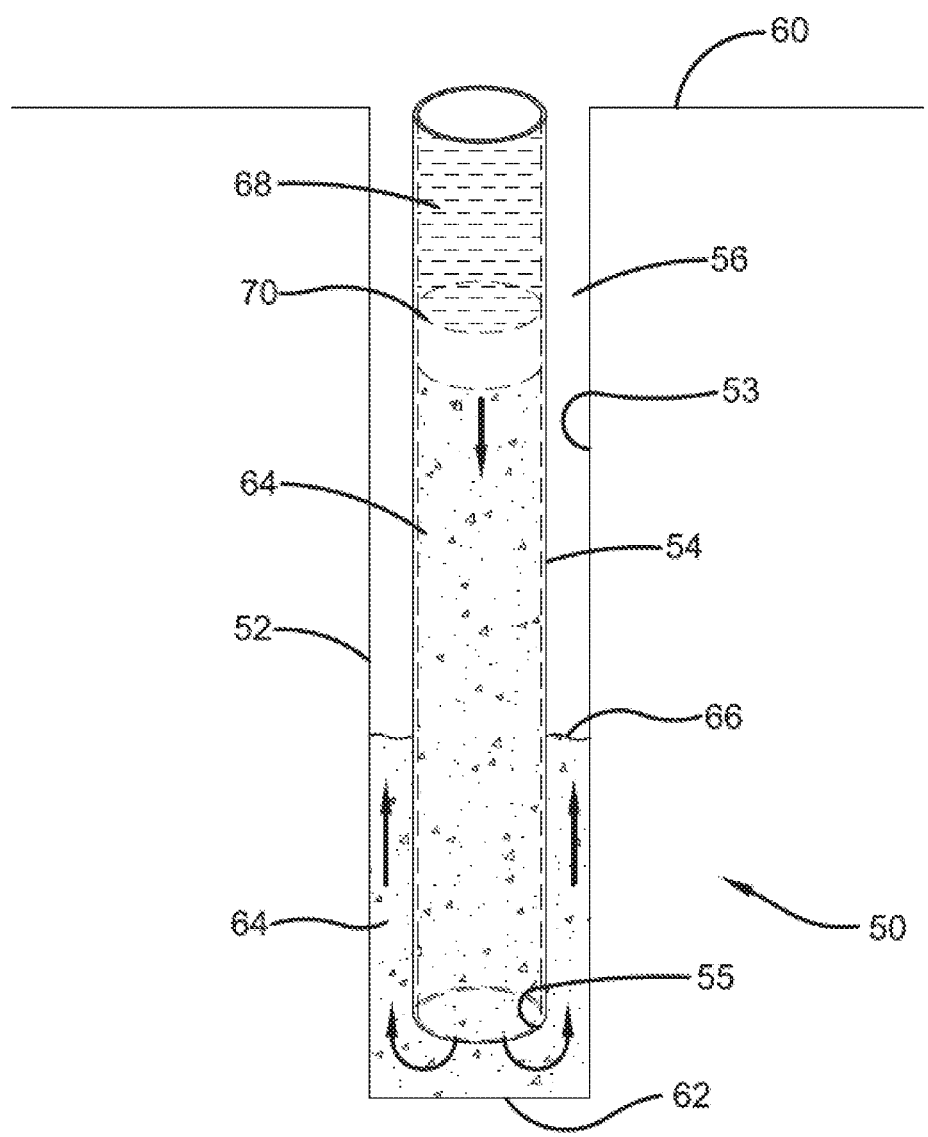
FIG. 2 is a schematic diagram of a well undergoing cementing according to aspects of the invention

In one or more embodiments, the step of placing the cements described herein within the desired annular space may include conventional techniques. For example, and again with reference to FIG. 2, a cement composition 64 is introduced into a tube (e.g. casing 54) disposed within well bore 52 to thereby form a cylindrical column of cement within the casing. A force may then be applied to the column of cement to thereby compress the column and cause the cement to exit an open end 55 of casing 54 proximate to bottom 62 of well bore 52. These compressive forces cause the cement to enter into annular space 56 and create a rising annular column of cement 66 within annular space 56. As shown in FIG. 2, a fluid 68 can be pumped behind the cylindrical column of concrete within casing 54, for example behind a plug device 70 (e.g. rubber cementing or wiping plugs), to thereby apply force to cement 64 and cause cement 64 to exit bottom 55 of casing 54 and enter annulus 56 as a rising column of cement 66. It will also be appreciate that the cements of the present invention can be positioned between one or more of the multitude of piping strings concentrically hung within a well bore.

Formation of Cemented Well Casing with Capture and Sequestration Region

In other embodiments of this invention, a cemented well casing is provided that includes a capture and sequestration region, which may also be referred to as a reactive layer. The capture and sequestration region includes an at least partially uncured cement composition (which may include a cement slurry) that includes synthetic wollastonite. Sub-surface carbon dioxide, which may include carbon dioxide employed for enhanced oil recovery (EOR), that migrates to the capture and sequestration region can react with the synthetic wollastonite and thereby become sequestered within the capture and sequestration region.

Figure 3:
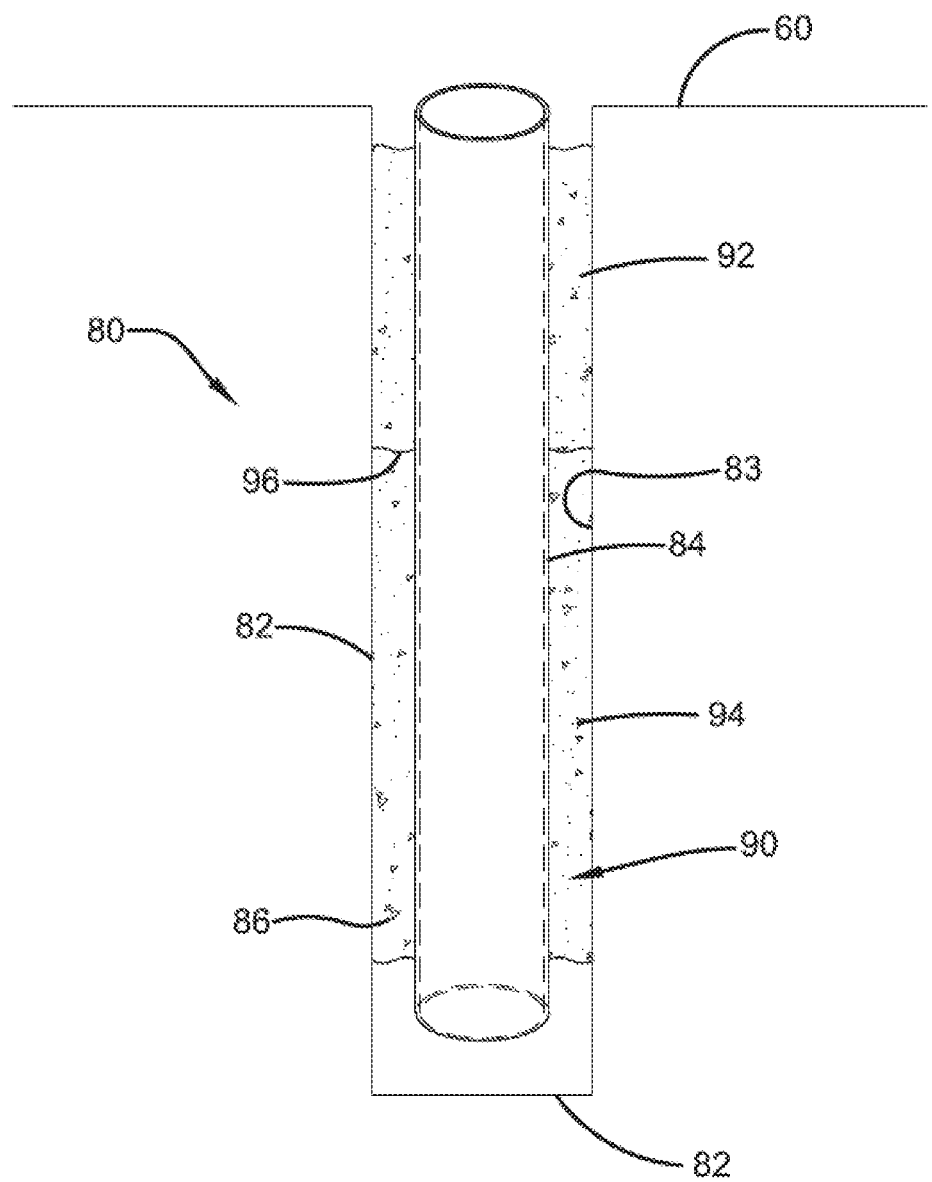
FIG. 3 is a schematic diagram of a well including multiple cement casing regions according to aspects of the present invention.

Aspects of these embodiments can be described with reference to FIG. 3, which shows well 80 including well bore 82 and piping string 84 positioned within well bore 82. In one more embodiments, piping string 84 may be the outermost piping, which may also be referred to as tubing or casing, within well bore 82 and is therefore the piping most proximate to an inner surface 83 of well bore 82. Well 80 may include multiple piping strings, with the additional piping strings being located concentrically within piping 84.

A generally annular space 86 exists between inner surface 83 and piping string 84. Annular space 86, which may also be referred to as annular volume 86, may generally extend from surface 60 (i.e. at the top of well bore 82) to bottom 82 of well bore 82. In other embodiments, it may extend for a portion of well bore 82. Cement casing 90, which may also be referred to as annular concrete column 90, includes first cement casing region 92 and second cement casing region 94. As shown, first region 92 and second region 94 may form interface 96, or in other embodiments, which are not shown, additional regions may exist between first region 92 and second region 94. As also shown, first region 92 is disposed closer to surface 60 relative to second region 94, which is proximate to bottom 82 of well bore 82.

According to embodiments of the present invention, first region 92 includes synthetic wollastonite (i.e. is formed from a calcium-deficient calcium silicate). In one or more embodiments, first region 92 includes synthetic wollastonite in amounts greater than 40 wt %, in other embodiments greater than 50 wt %, in other embodiments greater than 60 wt %, in other embodiments greater than 70 wt %, in other embodiments greater than 80 wt %, in other embodiments greater than 90 wt %, and in other embodiments greater than 95 wt %, based on the weight of the cement composition.

In these or other embodiments, second region 94 is formed from a conventional cement such as Portland cement; i.e. second region 94 is formed from a calcium-rich calcium silicate. As with other embodiments of this invention, the calcium-rich calcium silicates cement compositions may include synthetic wollastonite in amount of less than 50 wt %, in other embodiments less than 40 wt %, in other embodiments less than 30 wt %, in other embodiments less than 20 wt %, in other embodiments less than 10 wt %, in other embodiments less than 5 wt %, and in other embodiments less than 1 wt % based on the weight of the cement.

In other embodiments, first region 92 and second region 94 are formed from similar cement compositions (i.e. both are formed from calcium-deficient cement compositions), but the nature of the regions are different based upon the foaming gas employed. For example, in one or more embodiments, first region 92 is foamed with a gas that is substantially free of carbon dioxide (e.g. nitrogen), and second region 94 is foamed with a gas that substantially includes carbon dioxide. As result, the carbon dioxide within the composition that forms second region 94 reacts with the calcium-deficient cement to thereby cure the cement, while the lack of carbon dioxide within first region 92 permits the composition of first region 92 to remain reactive to carbon dioxide, which carbon dioxide may migrate to and react with first region 92 for capture and sequestration. In one or more embodiments, this can be accomplished by starting the foaming process with a gas stream that is substantially devoid of carbon dioxide (e.g. nitrogen or air) and then changing the gas stream to a gas stream that substantially includes carbon dioxide as the cement is placed downhole. The switch or changeover of the gas stream being used to foam the cement mixture can occur gradually to maintain consistency in the flow and lift characteristics of the cement.

For purposes of these embodiments, substantially free of carbon dioxide refers to a carbon dioxide gas stream that includes insufficient levels of carbon dioxide to effect a cure of a calcium-deficient cement composition. In one or more embodiments, the gas stream used to foam the cement within at least a portion of the capture and sequestration layer includes less than 1 vol %, in other embodiments less than 0.5 vol %, and in other embodiments includes less than 0.1 vol % carbon dioxide.

On the other hand, those gas streams that substantially include carbon dioxide include sufficient levels of carbon dioxide to effect a cure of a calcium-deficient cement composition. In one or more embodiments, the gas stream used to foam the cement within at least a portion of second region 94 (i.e. the region other than the capture and sequestration region) includes greater than 1 vol %, in other embodiments greater than 5 vol %, in other embodiments greater than 10 vol %, in other embodiments greater than 25 vol %, and in other embodiments greater than 50 vol % carbon dioxide. In these or other embodiments, the gas stream used to foam the cement within at least a portion of second region 94 (i.e. the region other than the capture and sequestration region) includes 100 vol %, in other embodiments less than 100 vol %, in other embodiments less than 90 vol %, in other embodiments less than 75 vol %, in other embodiments less than 50 vol %, and in other embodiments less than 25 vol % carbon dioxide. In one or more embodiments, the gas stream used to foam the cement within at least a portion of second region 94 (i.e. the region other than the capture and sequestration region) includes from about 1 to about 100, in other embodiments from about 5 to about 90, and in other embodiments from about 10 to about 80 vol % carbon dioxide.

The cemented casings of these embodiments may be prepared by using conventional techniques that are modified to sequentially introduce the cement compositions that give rise to the respective regions. For example, a composition for forming first region 92 (i.e. the region formed from calcium-deficient calcium silicates) is first introduced into piping string 84. Subsequently, a composition for forming second region 94 (i.e. the region formed from calcium-rich calcium silicates) is then introduced into piping string 84. Force is then applied to the cement column formed by the addition of these cement compositions to thereby force the cement into annular space 86. The cement compositions generally flow through piping string 84 and into annular space 86 in a generally plug-flow fashion, which results in the formation of first and second regions 92, 94.

With reference again to the formation of first region 92 (i.e. the capture and sequestration region), the cement compositions that are prepared to form this region are prepared without introducing, or by introducing only limited amounts of, carbon dioxide. In one or more embodiments, the cement compositions that are used to prepare first region 92, which refers to the composition initially placed into well bore 82 for final disposition at region 92, includes less than 1 vol %, in other embodiments less than 0.5 vol %, and in other embodiments less than 0.1 vol % carbon dioxide.

Use of Carbon Dioxide Generating Compounds

In yet other embodiments of the present invention, an oil production casing is cemented into place using a cement composition that includes a calcium-deficient calcium silicate and a compound that releases or generates carbon dioxide. In one or more embodiments, this cement may be formed into a slurry and placed into the annular space between the casing and the well bore using those known methods that have been described with respect to other embodiments described herein. In one or more embodiments, exemplary compounds that release or generate carbon dioxide include ethylene carbonate or oxalic acid derivatives. The cement compositions may also include water, gas stabilizing agents, accelerators, retarders, dispersants, fillers, foaming agents, anti-foaming agents, antisettling additives, expansion agents, gas-migration additives, or combinations thereof.

Various modifications and alterations that do not depart from the scope and spirit of this invention will become apparent to those skilled in the art. This invention is not to be duly limited to the illustrative embodiments set forth herein.

What is claimed is:

1. A method of cementing an annular space between a pipe string and a well bore, the method comprising steps of:
    (a) providing a calcium-deficient calcium silicate which has been subjected to a step of grinding such that the calcium-deficient calcium silicate consists of ground calcium silicate, wherein the ground calcium silicate has a median particle size of less than 200 µm;
    (b) preparing a cement composition including the calcium-deficient calcium silicate consisting of the ground calcium silicate having the median particle size of less than 200 µm;
    (c) mixing the cement composition with water to form a cement slurry;
    (d) mixing the cement slurry with carbon dioxide to form a foamed cement; and
    (e) placing the foamed cement in the annular space between the pipe string and the wellbore.

2. The method of claim 1, where said step (c) of mixing includes mixing the cement composition with water and a foaming agent.

3. The method of claim 1, where the calcium-deficient calcium silicate is selected from the group consisting of wollastonite, pseudowollastonite, rankinite, and mixtures of two or more thereof, wherein the ground calcium silicate has a median particle size of from 5 µm to less than 200 µm.

4. The method of claim 1, where the cement slurry includes less than 60 wt % water.

5. The method of claim 1, where a solids portion of the cement composition includes greater than 50 wt % of the calcium-deficient calcium silicate.

6. The method of claim 1, where the foamed cement has a carbon dioxide volume fraction of from about 8 to about 70%.

7. The method of claim 1, where said step (d) of mixing the cement slurry with carbon dioxide includes pressurizing the carbon dioxide to form a pressurized stream of carbon dioxide, and then contacting the pressurized stream of carbon dioxide with the cement slurry.

8. The method of claim 1, where the pipe string has a generally tubular configuration with a surface opening at or proximate to a surface opening in the well bore and a downhole opening opposite the surface opening, where said step (e) of placing the foamed cement includes first placing the foamed cement into the pipe string to form a foamed cement column within the pipe string, and then applying downward force on the foamed cement column to force the foamed cement out the pipe string through the downhole opening and into the annular space.

9. The method of claim 1, where a solids portion of the cement composition includes less than 50 wt % calcium-rich calcium silicates selected from the group consisting of alite and belite.

10. The method of claim 1, where the pipe string has a generally tubular configuration with a surface opening and a downhole opening opposite the surface opening, and a generally annular space existing between the pipe string and the well bore, where a first portion of the cement slurry is mixed with a first gas stream that is substantially free of carbon dioxide to form a first cement foam and where a second portion of the cement slurry is employed in said step (c) of mixing to form a second cement foam, and further comprising:
    (i) placing the first cement foam into a portion of the annular space to form a first generally annular column including first cement slurry; and
    (ii) placing the second cement foam into a portion of the annular space to form a second generally annular column including the second cement foam.

11. The process of claim 10, where the calcium-deficient calcium silicate is selected from the group consisting of wollastonite, pseudowollastonite, rankinite, and mixtures of two or more thereof.

12. The method of claim 10, where said second cement foam is formed by mixing a second portion of the cement slurry with a stream including greater than 50% by volume carbon dioxide.

13. The method of claim 12, where the stream substantially includes carbon dioxide.

14. The method of claim 1, where the carbon dioxide derives from a carbon dioxide stream that includes greater than 50% by volume carbon dioxide.

15. A process for cementing a pipe string within a well bore to form a carbon dioxide capture and sequestration region within a cement casing, where the pipe string has a generally tubular configuration with a surface opening and a downhole opening opposite the surface opening, and a generally annular space existing between the pipe string and the well bore; the method comprising:
    (a) providing a first cement composition including a calcium-deficient calcium silicate;
    (b) mixing the first cement composition with water to form a first cement slurry;
    (c) providing a second cement composition including a calcium-rich calcium silicate;
    (d) mixing the second cement composition with water to form a second cement slurry;
    (e) placing the first cement slurry into a portion of the annular space to form a first generally annular column including the first cement slurry; and
    (f) placing the second cement slurry into a portion of the annular space to form a second generally annular column including the second cement slurry, where said first generally annular column forms a carbon dioxide sequestration region.

16. The process of claim 15, where said step (e) of placing the first cement slurry is coordinated with said step (f) of placing the second cement slurry so that the first generally annular column is proximate to the surface opening of the pipe string relative to the second generally annular column.

17. A cemented production well including a carbon dioxide capture and sequestration region within a cement casing, the cemented production well comprising:
    (a) a well bore;
    (b) a pipe string within said well bore;

(c) a generally annular column of cement within at least a portion of the space between the pipe string and the well bore;

(d) a first generally annular region within the generally annular column of cement, said first generally annular region including a calcium-deficient calcium silicate, wherein said first generally annular region is a carbon dioxide sequestration region which is reactive to carbon dioxide, wherein the calcium-deficient calcium silicate consists of ground calcium silicate with a median particle size of less than 200 µm; and (e) a second generally annular region within the generally annular column of cement, said second generally annular region including a calcium-rich calcium silicate.

18. The cemented production well of claim 17, where the well bore includes a surface opening and a well bottom, and where the first generally annular region is proximate to the surface of the opening of the well bore relative to the second generally annular region.

19. The cemented production well of claim 17, where the calcium-deficient calcium silicate is selected from the group consisting of wollastonite, pseudowollastonite, rankinite, and mixtures of two or more thereof, wherein the calcium-deficient calcium silicate includes ground calcium silicate with a median particle size of from 5 µm to less than 200 µm.

* * * * *